United States Patent [19]

Dimmer

[11] 3,963,131
[45] June 15, 1976

[54] FRONT-END SKID STEER LOADER

[75] Inventor: Donald J. Dimmer, Thief River Falls, Minn.

[73] Assignee: Hydra-Mac, Inc., Thief River Falls, Minn.

[22] Filed: Jan. 6, 1975

[21] Appl. No.: 539,015

[52] U.S. Cl............................. 214/140; 180/89 R; 214/DIG. 7
[51] Int. Cl.² ......................................... E02F 3/36
[58] Field of Search ................ 296/28 C; 180/89 R; 214/140, 130, DIG. 7

[56] References Cited
UNITED STATES PATENTS

| | | | |
|---|---|---|---|
| 3,432,051 | 3/1969 | Borer et al. | 214/140 |
| 3,465,839 | 9/1969 | Pensa | 214/140 |
| 3,850,473 | 11/1974 | Huber | 214/140 |
| 3,869,018 | 3/1975 | Muller | 296/28 C |

Primary Examiner—Robert J. Spar
Assistant Examiner—Ross Weaver
Attorney, Agent, or Firm—Williamson, Bains & Moore

[57] ABSTRACT

A skid steer front-end loader includes a body comprised of a pair of similar body sections, each being formed from a single blank of material. Each body section includes a side wall, a bottom wall portion and a front wall portion. The bottom wall and front wall portions of the body section are disposed in lapped relation and are bolted together after each body section has been preassembled. The cab structure, including a floor plate, a back plate and a roof, are secured to the body and project rearwardly therefrom to position the operator completely rearwardly of the loader body.

4 Claims, 2 Drawing Figures

FRONT-END SKID STEER LOADER

SUMMARY OF THE INVENTION

This invention relates to a skid steer front-end loader.

In conventional skid steer front-end loaders, the vehicle body is laboriously assembled, each part being painted prior to its assembly on the body. In these commercial prior art skid steer loaders, the operator's seat is located intermediate the ends of the machine, even though some of these machines are quite compact and it is sometimes difficult for the operator to get on and off the machine. It is also essential in skid steer loaders that the weight of the machine be accurately distributed on the front and rear wheels in order to permit skid steering of the machine in loaded and unloaded conditions. This weight distribution is sometimes difficult to achieve when the loader is compact and small.

It is an object of this invention to provide a novel, compact skid steer loader comprised of substantially identical body sections, each of which may be substantially, completely preassembled, and then merely bolted together to form the complete body. With this arrangement, the entire loader may be very quickly and easily fabricated while maintaining the proper weight distribution on the front and rear wheels.

It is also an object of this invention to provide a skid steer loader vehicle having an operator's cab located rearwardly of the body of the vehicle which provides an optimum safe, comfortable location for the operator without interfering with the proper weight distribution on the wheels of the loader.

These and other objects and advantages of this invention will more fully appear from the following description made in connection with the accompanying drawings, wherein like reference characters refer to the same or similar parts throughout the several views.

FIGURES OF THE DRAWINGS

DESCRIPTION OF THE PREFERRED EMBODIMENTS OF THE INVENTION

Figure 1:
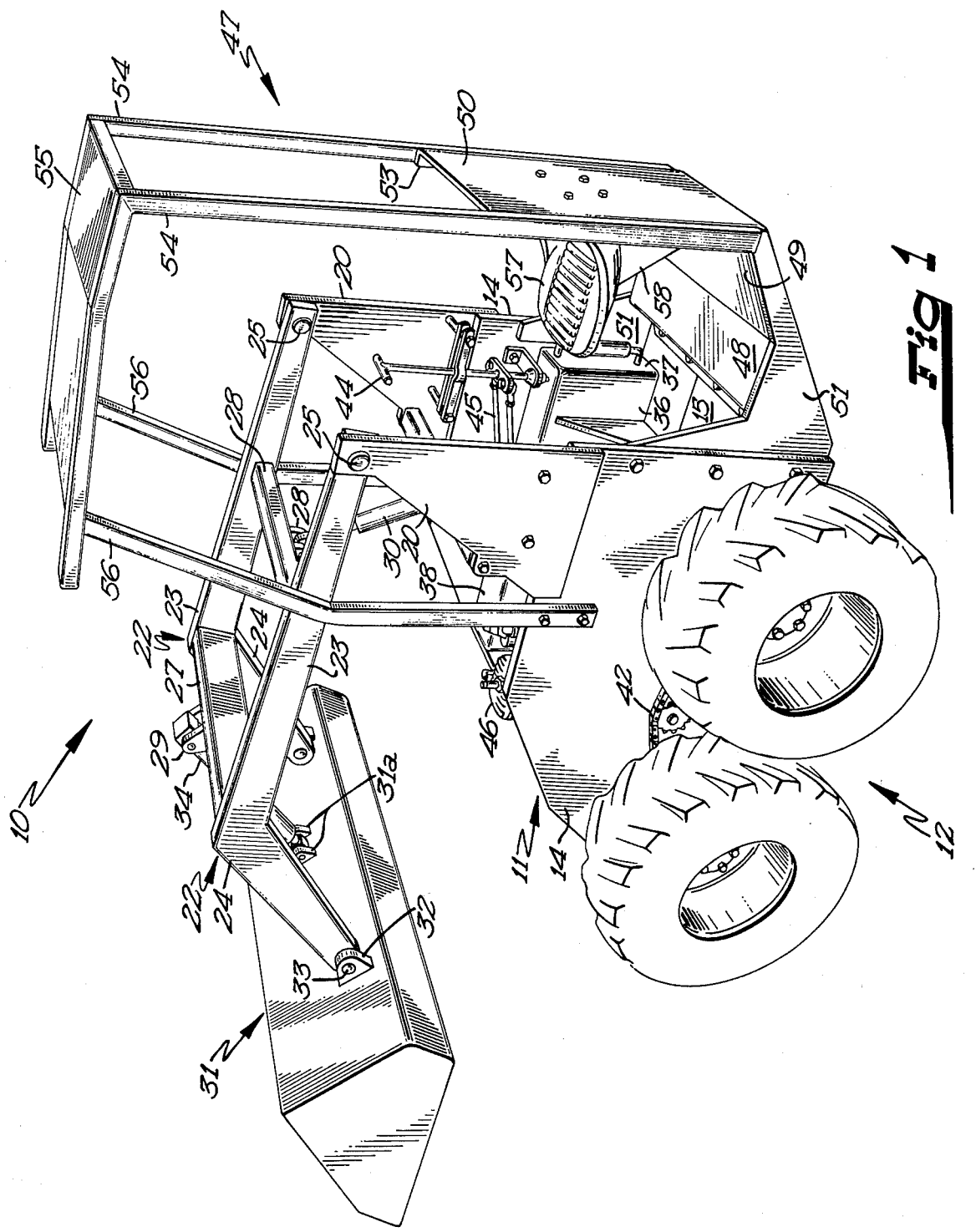
FIG. 1 is a rear perspective view of the loader.

Referring now to the drawings, and more specifically to FIG. 1, it will be seen that one embodiment of the novel compact skid steer loader, designated generally by the reference numeral 10, is there shown. The skid steer loader 10 includes a body 11 having front and rear pairs of ground engaging wheels 12 connected thereto for support thereof for travel over the surface of the ground. The loader is guided or steered by a skid steer action, wherein the wheels on one side are driven in one direction, while the wheels on the other side remain stationary or are driven in an opposite direction. This type of steering permits turning of the loader on its own vertical axis.

Figure 2:
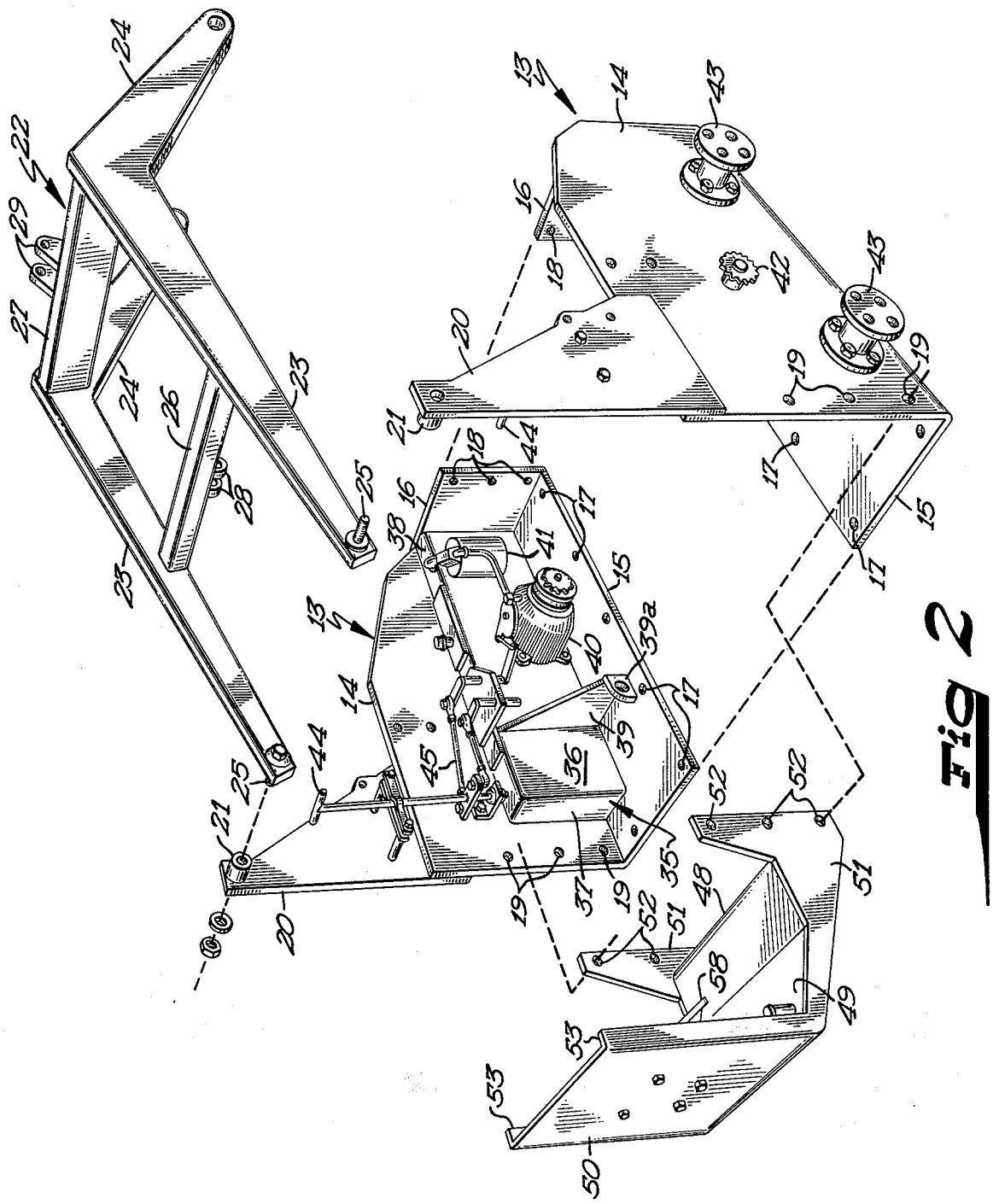
FIG. 2 is an explosion rear perspective view of the loader with certain parts thereof omitted for clarity.

Referring now to FIG. 2, it will be seen that the body 11 is comprised of a pair of body sections 13 which are substantially mirror images of each other. Each body section is actually stamped from a single blank of material and includes a side wall 14, a bottom wall 15 integral therewith and extending inwardly at right angles thereto, and a front wall portion 16 which is integral with the side wall and associated front wall portion. It will be noted that the front wall portion has a width dimension substantially identical to the width dimension of the bottom wall portion, but has a vertical dimension substantially less than the vertical dimension of the side wall. The inner edge portion of the bottom wall is provided with a plurality of longitudinally spaced openings 17 therein, while the inner edge portion of the front wall portion of each body section is also provided with a plurality of openings 18 therein. Similarly, the rear edge portion of the side walls is provided with a plurality of vertically spaced apart openings 19 therein.

Each body section 13 also has a substantially flat, boom support plate 20, rigidly affixed thereto and projecting upwardly therefrom, for support of a boom assembly 22. It will be noted that each boom support plate has its rear edge disposed in substantially vertical alignment of the rear edge of the associated side wall 14. Each boom support plate also has a pivot or trunion sleeve 21 affixed to the upper end thereof and projecting inwardly therefrom. The boom assembly 22 is comprised of a pair of substantially identical boom arms 23 which extend forwardly from the boom support plate and terminate in downwardly and forwardly extending front portions 24. The rear ends of the boom arms 23 are provided with trunions or pivots 25 which engage in the pivot or trunion sleeves 21 on the boom support plates 20. With this arrangement, the boom assembly may be swung vertically about a substantially horizontal transverse axis.

The boom assembly also includes a rear transverse arm 26 which extends between and is rigidly interconnected to the boom arms 23. A front transverse arm 27 is rigidly affixed to the boom arm 22 and extends therebetween adjacent the upper end of the front portions 24. The rear transverse arm 26 is provided with a pair of apertured ears thereon, intermediate the ends thereof, while the front transverse arm 27 is provided with a pair of apertured ears 29 intermediate the ends thereof.

The means for vertically shifting the boom assembly 22 about its axis, includes a single, double-acting hydraulic cylinder unit 30 which is pivotally connected at its lower end to the bottom wall of the body and which is pivotally connected at its upper end to the ears 22 located on the rear transverse arm 26. It will be seen that by extending and retracting the double-acting hydraulic cylinder unit 30, the boom assembly 22 may be readily raised and lowered. The boom assembly is also provided with a suitable implement such as a scoop or bucket 31. The bucket 11 is provided with pairs of apertured ears 32 on its rear wall which are pivotally connected to the apertured front ends of the front portions 24 of the boom arms 23 by pivots 33. It will htereofore be seen that the bucket 31 may also be pivoted about a transverse horizontal axis, relative to the boom assembly 22. The means for producing the pivoted movement of the bucket 31 comprises a double-acting hydraulic cylinder unit 34 which is connected by a pivot to the ears 29 on the front transverse arm 27 and which is also pivotally connected to ears 31a on the bucket 31. Extension and retraction of the hydraulic cylinder unit 34 produces pivoting of the bucket 31.

Each body section 13 is also provided with a tank-defining member 35 which is preferably formed of a single blank of metal and includes a side wall 36, an end wall 37 and a top wall 38. It will be noted that the tank-defining member 35 for each body section is rigidly secured to the associated body section in sealing relation thereto to define therewith a sealed tank. Each tank contains oil for constantly lubricating the chain and sprocket drive 42 to the stub axles 43 for each pair of ground-engaging wheels on one side of the vehicle. It will be noted that each tank-defining member has a vertical dimension corresponding to the vertical dimension of the front wall portion 15 of each body section. Each body section may also be provided with a gusset 49 for strengthening the tanks. It will be noted that the inner end of each gusset 39 is bent at right angles to define a bracket 39a which is suitably apertured for bolted engagement with the bracket on the gusset on the other body section. Each body section also includes a hydrostatic unit 40 for operating the ground-engaging wheels. Each hydrostatic unit also has associated therewith a suitable reservoir 41. The double-acting hydraulic cylinder units 30 and 34 are provided with suitable pumps and the two hydrastatic units as well as the double-acting hydraulic cylinder units are controlled by control levers 44, which in turn operate the linkages connected to the hydrastatic units and pumps. The control system used to operate the hydrastatic units and pumps are identical to that shown in U.S, Pat. No. 3,800,969.

When the body 11 is fabricated, each body section 13 will be completely preassembled wherein most of the parts for each section will be painted after assembly. After the body sections are substantially preassembled, the two sections are positioned so that the front and bottom wall portions thereof are disposed in lapped relation. When this is done, the openings in the bottom wall portion of one section will be disposed in registering relation with the openings in the bottom wall portion of the other section. Similarly, the openings in the front wall sections will be disposed in registering relation, and the two sections will be bolted together. It is pointed out that the width dimension of the bottom and front portions of one section are slightly greater than the width dimension of the bottom and front wall portions of the other section in order to accommodate the overlapped relation. In the embodiments shown, the body section shown on the right in FIG. 2, has the greater width dimension. A conventional internal combustion engine 46 is also provided for operating the hydrastatic units, and the engine will be installed after the assembly of the loader body 11.

The skid steer loader 10 also includes an operator's cab 47 which is located completely rearwardly of the vehicle body. The operator's cab 47 includes the floor plate 48 having a rear inclined portion 49 integral therewith, which in turn is rigidly affixed to a vertical back plate 10. Side plates 51 are affixed to the front portion of the floor plate and project forwardly and upwardly therefrom. The side plates 51 are provided with suitable openings 52 which are disposed in registering relation with the openings 19 in the side walls of the body sections to permit the cab to be attached to the side walls. The front portion of the floor plate is also provided with suitable apertures to permit bolting of the floor plate to the floor of the body 11.

The back plate 50 is also provided with side flanges 53 which are suitably apertured to permit rear posts 54 to be secured thereto, the rear posts projecting upwardly beyond the back plate 50. These rear posts are connected at their upper ends to a roof or top 55, which is supported at its front end by front posts 56 affixed to the side walls 14.

The cab is also provided with a seat 57 which is pivotally connected to the back wall by a pivot to permit the seat to be folded upwardly against the back plate or to be unfolded downwardly to project forwardly therefrom. The seat is also provided with a seat post 58 which is pivoted to the rear inclined portion of the floor plate 48. With this arrangement, the seat 57 may be unfolded to allow the operator to sit while operating the vehicle or the seat may be folded against the back plate to thereby allow the operator to comfortably stand in the cab while operating the vehicle. By positioning the cab completely rearwardly of the body 11, the operator not only has an excellent view of the work area, but it has been found that this location of the operator's cab is substantially safer than the location of the operator's seat intermediate the ends of the loader body. It will also be seen that this rear location of the operator's cab permits an operator to easily enter or exit from the cab. It has also been found that the location of the operator's cab in no way interferes with the accurate weight distribution on the front and rear wheels of the skid steer loader.

From the foregoing description, it will be seen that I have provided a novel skid steer loader which is not only of simple and inexpensive construction, but one which functions in a more efficient manner than comparable loaders.

What is claimed is:
1. A compact skid steer front-end loader comprising:
a body including a pair of substantially similar body sections, each section including a vertical, substantially flat side wall, each having a vertical rear edge, a substantially flat bottom wall portion integral with and having a length corresponding to the length of the associated side wall, each section including a substantially flat front wall portion integral with the associated side wall and bottom wall portion, each front wall portion having a vertical dimension less than the vertical dimension of the associated side wall and having a width dimension corresponding to the width dimension of the associated bottom wall portion,
the bottom wall portions and front wall portions of said sections being disposed in lapped relation, and being fixedly secured together,
a pair of substantially flat, upstanding boom support plates, each affixed to one of said side walls adjacent the rear of and projecting upwardly therefrom,
a boom assembly pivotally connected to the boom support plates and projecting forwardly therefrom, an implement pivotally mounted on the forward end of said boom assembly, means for pivoting the boom assembly about its pivot axis, and means on the boom assembly for pivoting the implement relative thereto,
front and rear pairs of ground-engaging wheels supporting said body for travel over the surface of the ground, means for driving said ground-engaging wheels,
said rear ground engaging wheels being positioned forwardly of the rear vertical edge of each side wall,
a cab structure including a floor plate, a back plate integral with said floor plate and extending upwardly therefrom, means connecting said cab structure to the rear portion of said body, whereby said cab structure is positioned rearwardly of the body, and rearwardly of said ground engaging wheels and said boom support plate.

2. The skid steer loader as defined in claim 1 and a pair of tank-defining structures affixed to each body section and defining therewith a closed tank containing drive components for each pair of ground-engaging wheels, said tank-defining structures being positioned interiorly of the side walls of each body section.

3. The skid steer loader as defined in claim 1 and an operator's seat pivotally mounted on the back plate of said cab structure.

4. The skid steer loader as defined in claim 1 wherein each of said boom support plates has a substantially straight rear vertical edge disposed in substantial vertical alignment with the rear vertical edge of the associated side wall.

* * * * *